Dec. 24, 1946.  M. C. HARROLD  2,412,981
MOTOR PROTECTOR
Filed Aug. 27, 1942

INVENTOR.
Marshall C Harrold
BY Spencer Hardman and Fahr
attorneys

Patented Dec. 24, 1946

2,412,981

UNITED STATES PATENT OFFICE 2,412,981

MOTOR PROTECTOR

Marshall C. Harrold, Dayton, Ohio, assignor to General Motors Corporation, Dayton, Ohio, a corporation of Delaware Application August 27, 1942, Serial No. 456,324

25 Claims. (Cl. 62—4)

This invention relates to motor protectors and more particularly to motor protectors for motor compressor units.

The proper protection of the windings of the larger sealed motor-compressor units of commercial size is a difficult problem. In the first place, the watts internal loss per square inch of radiating surface of the compressor becomes greater as the motor ratings increase; secondly, in sealed motor compressor units the winding temperatures are greatly dependent upon the superheat conditions of the refrigerant or vapor being compressed and the winding temperatures are also dependent upon the particular refrigerant or vapor being compressed; thirdly, the compressor may operate continuously at high back or suction pressures and tripping of the overload under such conditions, because of the heavy loading, would be objectionable.

It is an object of my invention to provide a motor protector which will allow the motor-compressor unit to operate up to the highest safe limit of motor winding temperature and yet adequately protect the motor windings by deenergizing the motor when the highest safe temperature is exceeded.

It is another object of my invention to provide a motor protector whose rating or tripping setting varies according to the cooling conditions of the refrigerant passing through the sealed unit.

It is another object of my invention to provide a motor protector whose rating or tripping setting varies according to the compressor load.

It is another object of my invention to provide a motor protector whose rating or tripping setting varies according to the suction or back pressure of the compressor.

It is still another object of my invention to provide a motor protector whose rating or tripping setting varies according to the compressor discharge or condenser pressure.

Where motor protectors are self-resetting it is possible for the windings to be properly protected for one or several resettings, but where the stalling conditions continue for long periods of time, it is possible for the windings to become damaged by the successive rushes of current through the motor on each starting attempt.

It is still another object of my invention to provide a motor protector having a resetting control which is varied according to the number of successive attempts to start so that the time between tripping and resetting is increased as the successive attempts to start increase.

These objects are attained by providing a motor protector having an adjustment which is automatically responsive to either the suction or discharge pressure of the compressor, so that the motor protector rating is raised in accordance with improved cooling conditions of the motor, which are improved by the increase in suction or discharge pressure. The control is also provided with a thermally actuated resetting adjustment which is heated by an electric heater coincidentally with the energization of the motor starting winding so that this adjustment is varied in substantially direct accordance with the number of successive attempts to start the motor to increase the time between tripping and resetting so as to allow greater opportunity for the motor to cool between attempts to start.

Further objects and advantages of the present invention will be apparent from the following description, reference being had to the accompanying drawing, wherein a preferred form of the present invention is clearly shown.

Figure 1:
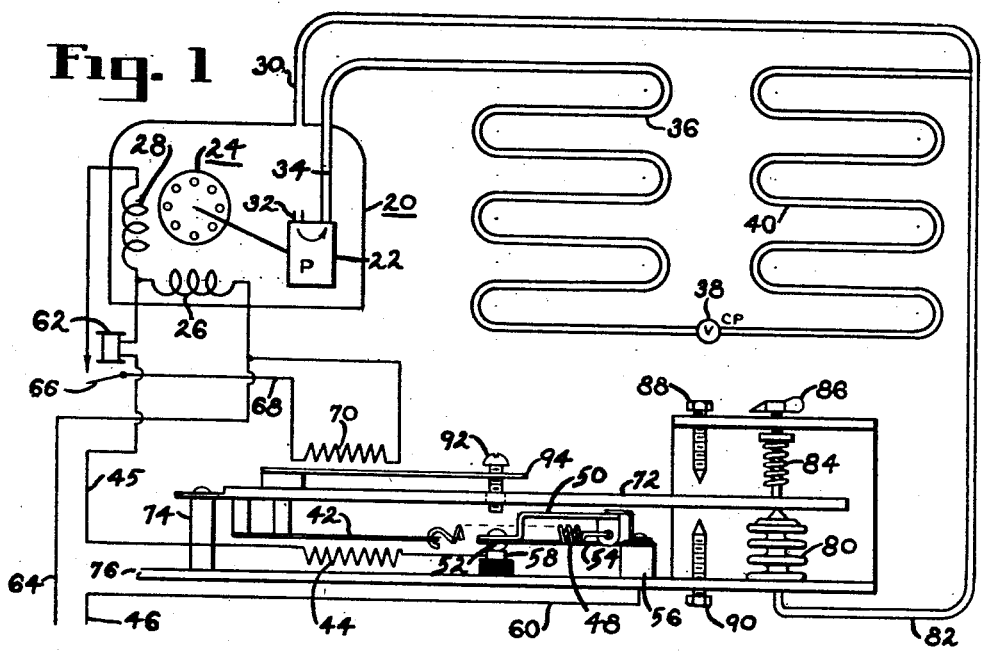
Fig. 1 is a diagrammatic view of a motor protector and refrigerating system embodying one form of my invention.

Referring now to the drawing and more particularly to Fig. 1, there is shown for the purpose of illustrating one specific application of my invention, a refrigerating system including a sealed unit 20 containing a compressor 22 and an electric motor 24 having a running winding 26 and a starting winding 28. The sealed unit is of the so-called low side type in which the interior of the casing is connected to the suction conduit 30 while the suction inlet 32 of the compressor communicates directly with the interior of the sealed unit. The compressor 22 discharges through a conduit 34 directly to the condenser 36 where the compressed refrigerant is liquefied and supplied under the control of a suitable expansion valve 38 to an evaporator 40 where the liquefied refrigerant evaporates substantially at the suction pressure of the compressor 22. The refrigerant is withdrawn from the evaporator 40 and through the suction conduit 30 in a vapor form.

When the system operates under light loads, the suction or back pressure is low and the condenser pressure is low. The evaporated refrigerant enters the sealed unit at a low temperature and receives heat from the electric motor thereby raising its temperature, increasing its volume and reducing its density while it is cooling the electric motor 24 and its windings 26 and 28. Although the possible rise in temperature of the refrigerant drawn into the sealed unit is quite large, its cooling capacity is limted because of its low density. In fact as the load increases, the suction or evaporator pressure and temperature increases so that the possible temperature rise of the refrigerant in the sealed unit is reduced. But in spite of this, the cooling effect of the refrigerant is greater because the density of the refrigerant entering the sealed unit increases at a much faster rate than the decrease in the maximum possible rise in temperature.

Heretofore it has been customary to use a simple thermal overload for protecting such a motor-compressor unit. Such a thermal overload may include, for example, an operating bimetal 42 heated by radiant heat from an electric heater 44 which is connected in series with one of the supply conductors 46. The operating bimetal 42 is connected to one end of each of a pair of tension toggle springs 48 of a toggle mechanism which includes a rigid toggle arm 50 provided with a pair of ears which receive the other ends of the toggle springs 48. The other end of the arm 50 is riveted by a movable switch contact 52 to a flexible strip 54 having its opposite end anchored to a post 56. The electric heater 44 is connected to a stationary switch contact 58 and when the protector is closed the current flows to the movable contact 52 and through the strip 54 to the post 56 which is connected by a conductor 60 to the supply conductor 46. The heater 44 is connected by a conductor 45 to the starting relay 62 connected to the common terminal of the running winding 26 and the starting winding 28.

The other end of the running winding 26 is connected to the supply conductor 64. The other end of the starting winding 28 is connected to the starting winding contacts 66 which in turn are connected through the conductor 68 and an electric heater 70 to the supply conductor 64. The motor protector is provided with an adjusting bar 72 upon which is anchored one end of the operating bimetal 42. The adjusting bar 72 is pivoted at its left end to a post 74 extending up from the frame 76.

A simple motor protector in series with the supply conductor will not take into account the varying cooling conditions and the varying suction and discharge pressures of the compressor and its sealed unit. With the simple motor protector, the motor is deenergized when the current flow increases to the rating for which it is set. Obviously, such a protector has no means to take into account the difference in motor winding temperatures which occur with varying loads. Inasmuch as the motor windings are the danger points, the motor will not be allowed to operate at its full load under conditions of heavy load and high back and suction pressure if the protector is set low enough to properly protect the windings under low load conditions and low back pressures. Also, if the protector is set to allow the maximum current passage through the motor under heavy load conditions when it is most needed, then the motor windings are subject to damage because of excessive winding temperatures and lack of adequate cooling during light load conditions.

Figure 3:
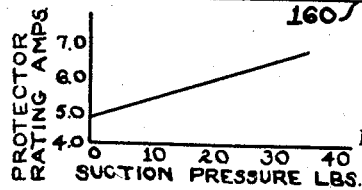
Fig. 3 is a graph showing the increase in the protector rating with the increase in suction pressure.

In order to overcome this difficulty and to make it possible for the motor to operate at its maximum load under all conditions without tripping the protector and yet to adequately protect the windings under all conditions, I propose to increase the protector rating in accordance with the increase in suction pressure. The graph disclosed in Fig. 3 shows that at zero pounds back pressure the protector rating is about 4.8 amperes, while at 35 lbs. suction pressures the protector rating is about 7 amperes.

To accomplish this change in protector rating, I provide a bellows 80 which is connected by tubing 82 to suction conduit 30. This bellows 80 supports the movable end of the adjusting bar 72 and is opposed by a compression type coil spring 84 which has its tension adjusted by an adjusting screw 86. With this arrangement, when the suction pressure is lowered, the bellows 80 partially collapses thereby lowering the right end of the adjusting bar 72 to reduce the protector rating. Likewise as the suction pressure increases, the bellows 80 will expand and raise the adjusting bar 72 against the tension of the spring 84 to raise the protector rating. The adjusting screw 86 may be turned to vary the tension of the spring 84 so as to adjust the protector for different refrigerants and for different sizes and types of systems. The set screws 88 and 90 are provided to keep the expansion of the bellows 80 within safe limits and also to provide an upper and a lower limit upon this adjustment of the protector rating.

Under stalling conditions with this type of system, the protector will continuously trip and reset, allowing current to flow through the motor during each starting attempt between the resetting and the tripping time. I have found that with the thermal type of overload protection, the temperature of the motor windings rises according to the number of successive starting attempts. Under such conditions, the windings may be properly protected for several resettings, but with many successive resettings, the windings will gradually rise in temperature until they exceed a safe limit. In order to overcome this, I propose to increase the time between tripping and resetting according to the number of starting attempts.

To do this, I mount the usual adjustable resetting screw 92, which serves as a stop to limit the opening movement of the movable contact 52, upon the free end of a bimetal strip 94. The resetting time of the thermal overload is determined by the position of the resetting screw 92. If the resetting screw 92 is moved away from the stationary contact 58 to allow a wider opening of the contacts, the temperature is lowered at which the bimetal 42 resets the toggle mechanism and closes the contacts. In order to use this property of the toggle mechanism to increase the tripping time in accordance with the number of starting attempts, I position the bimetal 42 with its material of lesser expansion adjacent the heater 44 so that when the starting relay 62 is closed during each starting attempt, the heater 70 will heat the bimetal 94 to cause it to curl upwardly a very short distance and raise the reset adjusting screw 92. The heating effect upon the bimetal 94 will be cumulative for successive starting attempts so that the temperature of the bimetal 94 and the resetting time of the relay will increase according to successive starting attempts. This adjustment of the resetting time will allow increased loading of the electric motor without damage to the windings and will give more rapid resetting when conditions permit so as to reduce the amount of idle time because of motor failure under most circumstances, and yet the windings are properly protected at all times.

Figure 2:
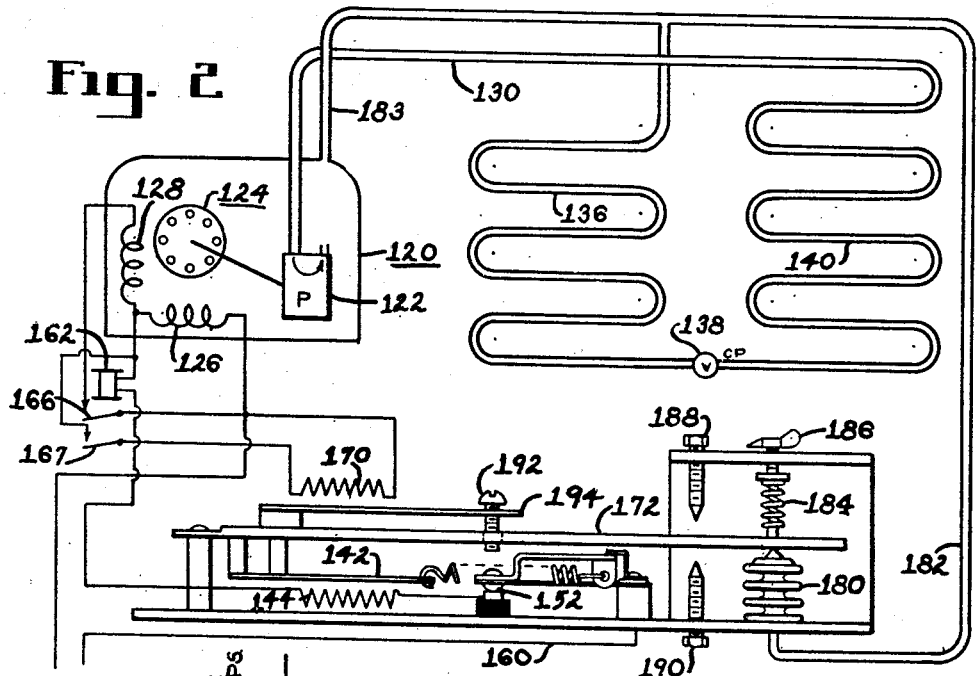
Fig. 2 is a diagrammatic view of a portion of the motor protector and refrigerating system embodying another form of my invention.

In Fig. 2 I have shown a modified form of the invention illustrating some of the variations which can be made in the control and its application to another type of system. In this system, the sealed unit 120 is placed upon the high side of the system and the compressor 122 withdraws refrigerant directly from the evaporator 140 through the suction conduit 130. The compressor 122 discharges directly into the interior of the sealed unit 120 so that the compressed refrigerant may contact and cool the electric motor 124, its running winding 126 and its starting winding 128. The interior of the sealed unit is connected to the condenser 136 from which liquefied refrigerant flows to the evaporator under the control of a suitable expansion valve 138. A bimetal type thermal overload protector has its contacts 152 and its main operating heater 144 connected in series with the supply conductor 160 which connects to the starting relay 162.

As the load on the refrigerating system increases, the evaporator or suction pressure rises, thus increasing the volume of compressed refrigerant discharged into the sealed unit 120. The increase in volume of refrigerant discharged increases the condenser pressure and temperature. This causes an increased density of the refrigerant circulating within the sealed unit so that the amount of cooling of the motor 124 and its windings 126 and 128 is increased in accordance with the higher condenser pressure and temperature. To allow a greater load upon the motor in accordance with the increased cooling, I provide a bellows 180 which is connected by tubing 182 to the discharge conduit 183 extending from the sealed unit 120 to the condenser 136. As the discharge pressure and the condenser temperature rises, the bellows 180 expands to raise the adjusting bar 172 to increase the temperature at which the operating bimetal 142 trips and resets. This arrangement increases the maximum current flow permitted by the relay before tripping.

As before, set screws 188 and 190, are provided for limiting the adjustment of the adjusting bar 172 provided by the bellows 180. The expansion of the bellows 180 may be controlled by a spring 184 and adjusted by an adjusting screw 186. To increase the resetting time of the relay in accordance with the number of successive attempts to start, there is provided a bimetal 194 which raises the adjusting screw in increasing amounts when heated by successive energizations of the auxiliary heater 170. This auxiliary heater 170 is connected in a separate shunt circuit controlled by the second set of relay contacts 167 which are controlled simultaneously with the first relay contacts 166 which control the starting winding circuit.

Thus, as in the first modification, the protector is adjusted to provide an increased rating in accordance with increasing discharge or condenser pressure and to provide an increased resetting time in accordance with the number of successive attempts to start. Inasmuch as the condenser pressure is proportional to the condenser temperature and the evaporator temperature is proportional to the evaporator pressure, thermostat bulbs applied to either the condenser or the evaporator may be used as the equivalents of the direct pressure connections, if desired. Thus by these expedients the permissible power output of the motor is increased without reducing its protection.

While the form of embodiment of the invention as herein disclosed, constitutes a preferred form, it is to be understood that other forms might be adopted, all coming within the scope of the claims.

What is claimed is as follows:

1. In combination, a compressor having a suction entrance and a discharge outlet for compressed fluid, an electric motor for driving the compressor, said electric motor being cooled by the circulation of said fluid, an overload protector responsive to the electric motor current for deenergizing said electric motor, and pressure responsive means for adjusting in accordance with the load upon the compressor the setting of the current value of which said protector deenergizes said electric motor.

2. In combination, a compressor having a suction entrance and a discharge outlet for compressed fluid, an electric motor for driving the compressor, said electric motor being cooled by the circulation of said fluid, an overload protector responsive to the electric motor current for deenergizing said electric motor, and means for adjusting in accordance with the suction pressure of the compressor the setting of the current value at which said protector deenergizes said electric motor.

3. In combination, a compressor having a suction entrance and a discharge outlet for compressed fluid, an electric motor for driving the compressor, said electric motor being cooled by the circulation of said fluid, an overload protector responsive to the electric motor current for deenergizing said electric motor, and means for adjusting in accordance with the discharge pressure of the compressor the setting of the current value at which said protector deenergizes said electric motor.

4. Refrigerating apparatus including an evaporator, a condenser, a sealed unit containing a compressor and an electric motor for driving the compressor for withdrawing refrigerant from the evaporator and forwarding it to the condenser and for circulating the refrigerant in contact with the motor, an overload protector responsive to the electric motor current for deenergizing the motor, and means for adjusting in accordance with evaporator pressure the setting of the current value at which said protector deenergizes said electric motor.

5. Refrigerating apparatus including an evaporator, a condenser, a sealed unit containing a compressor and an electric motor for driving the compressor for withdrawing refrigerant from the evaporator and forwarding it to the condenser and for circulating the refrigerant in contact with the motor, an overload protector responsive to the electric motor current for deenergizing the motor, and means for adjusting in accordance with condenser pressure the setting of the current value at which said protector deenergizes said electric motor.

6. Refrigerating apparatus including an evaporator, a condenser, a compressor for withdrawing evaporated refrigerant from the evaporator and for forwarding it to the condenser, an electric motor for driving the compressor, an overload protector responsive to the electric motor current for deenergizing the motor, and means for adjusting in accordance with evaporator pressure the setting of the current value at which said protector deenergizes said electric motor.

7. Refrigerating apparatus including an evaporator, a condenser, a compressor for withdrawing evaporated refrigerant from the evaporator and for forwarding it to the condenser, an electric motor for driving the compressor, an overload protector responsive to the electric motor current for deenergizing the motor, and means for adjusting in accordance with condenser pressure the setting of the current value at which said protector deenergizes said electric motor.

8. In combination, a compressor having a suction entrance and a discharge outlet, an electric motor for driving the compressor, an overload protector responsive to the electric motor current for deenergizing said electric motor, and pressure responsive means for adjusting in accordance with the load upon the compressor the setting of the current value at which said protector deenergizes said electric motor.

9. In combination, a compressor having a suction entrance and a discharge outlet, an electric motor for driving the compressor, an overload protector responsive to the electric motor current for deenergizing said electric motor, and means for adjusting in accordance with the suction pressure of the compressor the setting of the current value at which said protector deenergizes said electric motor.

10. In combination, a compressor having a suction entrance and a discharge outlet, an electric motor for driving the compressor, an overload protector responsive to the electric motor current for deenergizing said electric motor, and means for adjusting in accordance with the discharge pressure of the compressor the setting of the current value at which said protector deenergizes said electric motor.

11. In combination, a compressor having a suction entrance and a discharge outlet, an electric motor for driving the compressor, an overload protector for deenergizing said electric motor, said protector including a toggle mechanism having a stop for determining its reclosing setting, and means cumulatively responsive to successive starting efforts for moving said stop.

12. In combination, a compressor having a suction entrance and a discharge outlet, an electric motor for driving the compressor, an overload protector for deenergizing said electric motor, said protector including a toggle mechanism having a stop for determining its reclosing setting, and thermal means heated during each starting period for changing the position of said stop.

13. In combination, a compressor having a suction entrance and a discharge outlet, an electric motor for driving the compressor, an overload protector for deenergizing said electric motor, said protector including a toggle mechanism having a stop for determining its reclosing setting, a thermal means operatively connected to said stop, and means for changing the temperature of said thermal means during each starting period.

14. In combination, an electric motor, an overload protector for deenergizing the electric motor, said overload protector including a toggle mechanism having a stop for determining its reclosing setting, and means cumulatively responsive only to successive starting efforts of the electric motor for moving said stop.

15. In combination, an electric motor, an overload protector for deenergizing the electric motor, said overload protector including a toggle mechanism having a stop for determining its reclosing setting, and thermal means heated during each starting period of said motor for changing the position of said stop.

16. In combination, an electric motor, an overload protector for deenergizing the electric motor, said overload protector including a toggle mechanism having a stop for determining its reclosing setting, a thermal means operatively connected to said stop, and means for changing the temperature of said thermal means during each starting period of said motor.

17. In combination, an electric motor, a starting control for controlling the electric motor during the starting period, a self-resetting overload protector for deenergizing said electric motor, said overload protector including a stop for determining its reclosing setting, and means responsive to said starting control for moving said stop.

18. In combination, an electric motor, a starting control for controlling the electric motor during the starting period, a self-resetting overload protector having a movable means for deenergizing said electric motor, and a second movable means controlled directly by said starting control and responsive to successive starting efforts of the electric motor for controlling the resetting of said overload protector, said second movable means operating independently of the first mentioned movable means to protect the motor against excessive temperatures.

19. Refrigerating apparatus including an evaporator, a condenser, a sealed unit containing a compressor and an electric motor for driving the compressor for withdrawing refrigerant from the evaporator and forwarding it to the condenser and for circulating the refrigerant in contact with the motor, an overload protector responsive to current flow through the motor for deenergizing the motor upon an overload, and means for adjusting substantially in accordance with the refrigerant pressure conditions within the sealed unit the setting of the current value at which said protector deenergizes said electric motor.

20. Refrigerating apparatus including an evaporator, a condenser, a sealed unit containing a compressor and an electric motor for driving the compressor for withdrawing refrigerant from the evaporator and forwarding it to the condenser and for circulating the refrigerant in contact with the motor, an overload protector responsive to current flow through the motor for deenergizing the motor upon an overload, and means for adjusting substantially in accordance with the heat dissipating effect of the refrigerant in the sealed unit upon the motor the setting of the current value at which said protector deenergizes said electric motor.

21. Refrigerating apparatus including an evaporator, a condenser, a sealed unit containing a compressor and an electric motor for driving the compressor for withdrawing refrigerant from the evaporator and forwarding it to the condenser and for circulating the refrigerant in contact with the motor, an overload protector responsive to current flow through the motor for deenergizing the motor upon an overload, and means for adjusting substantially in accordance with the refrigerant temperature conditions within the sealed unit the setting of the current value at which said protector deenergizes said electric motor.

22. Refrigerating apparatus including an evaporator, a condenser, a compressor for withdrawing evaporated refrigerant from the evaporator and for forwarding it to the condenser, an electric motor for driving the compressor, an overload protector responsive to the electric motor current for deenergizing the motor, and means for adjusting in accordance with evaporator temperature the setting of the current value at which said protector deenergizes said electric motor.

23. Refrigerating apparatus including an evaporator, a condenser, a compressor for withdrawing evaporated refrigerant from the evaporator and for forwarding it to the condenser, an electric motor for driving the compressor, an overload protector responsive to the electric motor current for deenergizing the motor, and means for adjusting in accordance with condenser temperature the setting of the current value at which said protector deenergizes said electric motor.

24. In combination, a compressor having a suction entrance and a discharge outlet, an electric motor for driving the compressor, an overload protector responsive to the electric motor current for deenergizing said electric motor, and temperature responsive means for adjusting in accordance with the load upon the compressor the setting of the current value at which said protector deenergizes said electric motor.

25. In combination, an electric motor, an overload protector for deenergizing the electric motor, said overload protector including a toggle mechanism having a stop for determining its reclosing setting, and thermal means heated by current during the starting of said motor for changing the position of said stop.

MARSHALL C. HARROLD.